United States Patent
Taylor

(10) Patent No.: US 6,206,328 B1
(45) Date of Patent: Mar. 27, 2001

(54) CENTRIFUGAL GRAVITY HABITATION TORUS CONSTRUCTED OF SALVAGED ORBITAL DEBRIS

(76) Inventor: Thomas C. Taylor, 3705 Canyon Ridge Arc, Las Cruces, NM (US) 88011

( * ) Notice: Subject to any disclaimer, the term of this patent is extended or adjusted under 35 U.S.C. 154(b) by 0 days.

(21) Appl. No.: 09/188,076

(22) Filed: Nov. 9, 1998

(51) Int. Cl.⁷ .................................................. B64G 1/56
(52) U.S. Cl. ...................... 244/159; 244/163; 244/158 R
(58) Field of Search ................ 244/158 R, 159, 244/160, 161, 162, 163, 173

(56) References Cited

U.S. PATENT DOCUMENTS

| | | | |
|---|---|---|---|
| 3,169,725 | * 2/1965 | Berglund | 244/159 |
| 3,210,026 | * 10/1965 | Frisch | 244/159 |
| 3,300,162 | * 1/1967 | Maynard et al. | 244/159 |
| 3,973,363 | 8/1976 | LaPorte et al. . | |
| 4,132,373 | * 1/1979 | Lang | 244/120 |
| 4,451,017 | * 5/1984 | Marshall | 244/172 |
| 4,650,139 | 3/1987 | Taylor et al. . | |
| 4,728,060 | * 3/1988 | Cohen | 244/159 |
| 4,730,797 | 3/1988 | Minovitch . | |
| 4,790,499 | 12/1988 | Taylor et al. . | |
| 4,792,108 | 12/1988 | Bull . | |
| 4,807,833 | * 2/1989 | Pori | 244/159 |
| 5,073,317 | * 12/1991 | Brotz | 244/159 |
| 5,094,409 | * 3/1992 | King et al. | 244/159 |
| 5,339,574 | 8/1994 | Downing . | |
| 5,350,138 | * 9/1994 | Culbertson et al. | 244/159 |
| 5,813,632 | 9/1998 | Taylor . | |
| 6,045,094 | * 4/2000 | Rivera | 244/159 |

* cited by examiner

Primary Examiner—Galen L. Barefoot
(74) Attorney, Agent, or Firm—Jones Volentine, LLC

(57) ABSTRACT

An aerospace hardware derelict item is salvaged in space, modified, and reused to provide manned facilities in orbit. The hardware packages added onto the salvaged discarded item enhances its value, and incorporates at least the subsystems required to effectively reuse portions of previously discarded launch vehicle components, and other derelict objects in space. The hardware, and technique used reduces the cost of launching comparable hardware to orbit, because of the reuse, and provides a human habitation in orbit. The salvaged items include the external tank of the space shuttle, other derelict orbital hardware, the add-on cargo pod in two forms, and the ability to convert the derelict into a cost effective reusable item. The salvaged hardware is initially capable of contributing mass, length, interior volume, strongback, rotational stability mass, interior pressurized volumes, artificial gravity, and stability with the addition of simple subsystems for salvage, and interior development packages.

19 Claims, 10 Drawing Sheets

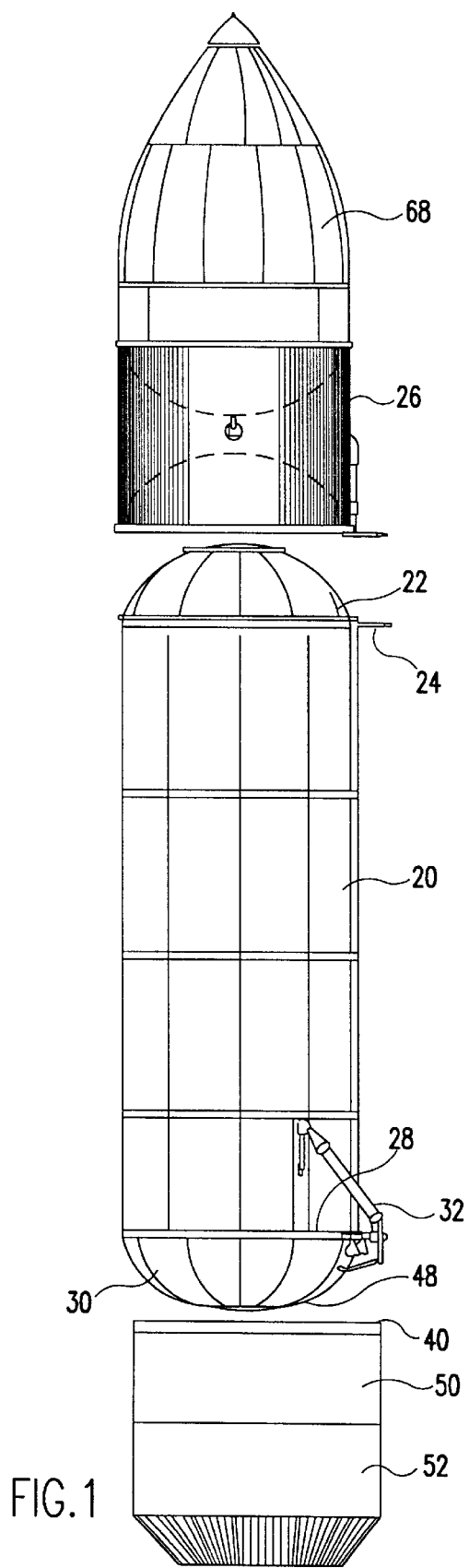
FIG.1
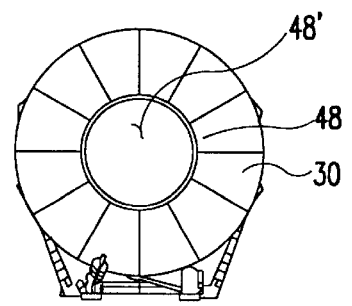
FIG.2
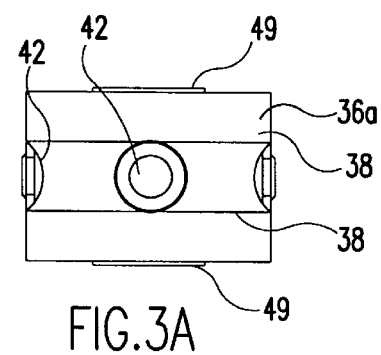
FIG.3A
FIG.3B
FIG.3C    FIG.3D

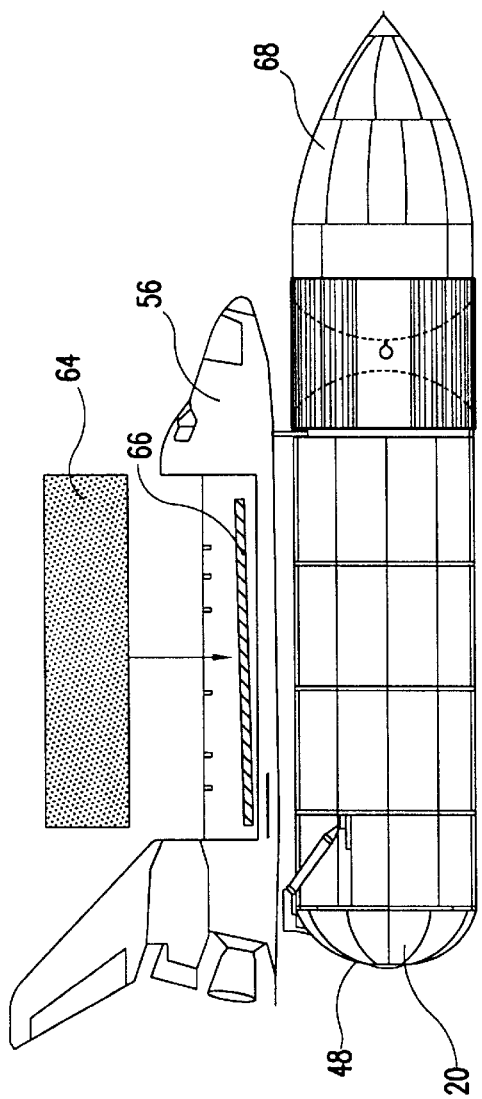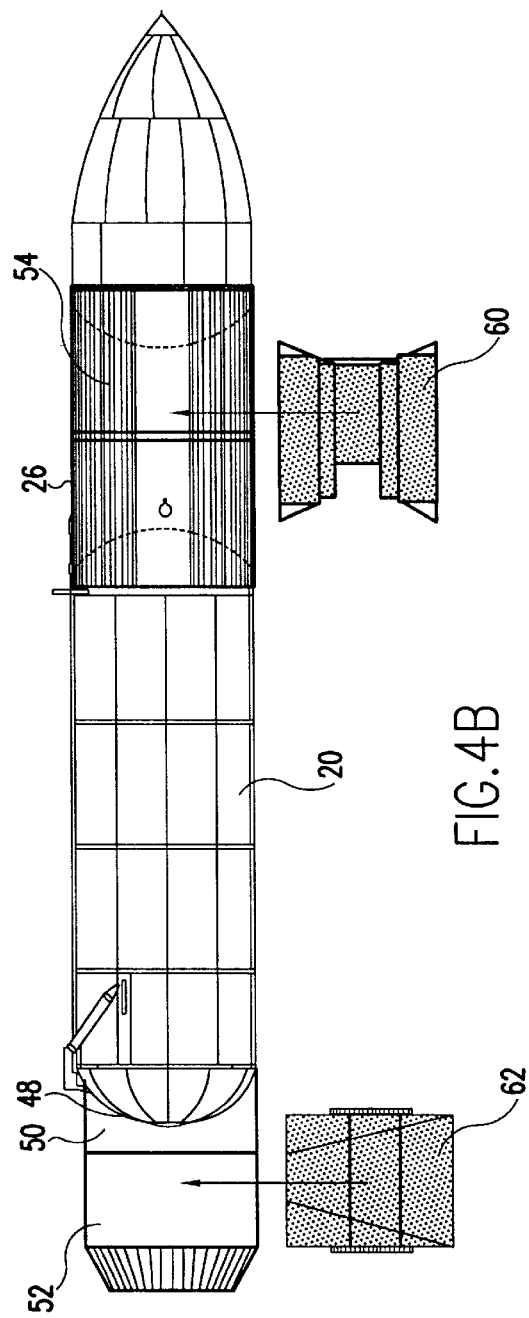

CENTRIFUGAL GRAVITY HABITATION TORUS CONSTRUCTED OF SALVAGED ORBITAL DEBRIS

BACKGROUND OF THE INVENTION

1. Field of the Invention

The present invention relates to a centrifugal gravity habitation torus constructed of salvaged orbital debris, which is a reusable aerospace structure adapted to be placed in an orbit, and is an improvement in aeronautical hardware.

2. Background of the Related Art

Space is an emerging economic frontier for mankind, but the cost of transportation into orbit and the hardware required for habitation once in orbit have been a barrier to commercial exploitation. The present cost of cargo transportation into orbit is in the range of $16,000 per pound using fully expendable and partly reusable space launch vehicles such as the space shuttle. A reduction in the cost of space transportation into orbit using fully reusable vehicles is on the threshold of development, and could shortly reduce the transportation costs to one-tenth their present levels.

The result of this type of cost reduction will be similar to the effect a similar cost reduction had on the aircraft industry in its developmental stages. That effect can be summarized as follows: first, the aircraft single trip high revenue cargo market increased; second, the medium revenue special cargo market flourished; and third, human passengers became commonplace.

Analogous progress in the space transportation field to date is as follows: first, the expendable rocket market is continuing to place high revenue communications satellites into geosyncronous orbit; and second, research payloads such as the SPACEHAB Module (Spacehab, Inc.) are transporting medium revenue cargo to space stations like the Russian MIR and the emerging international space station. So far, however, passenger traffic has eluded the space launch industry.

The emergence of reusable space launch vehicles will accelerate the cost reduction required for passenger traffic into orbit. Tourism is currently the largest industry on the planet. Space tourism, requiring a trip of just 200 miles overhead into Earth orbit, would put tourists into a different environment with a different gravity and spectacular views of the Earth and outer orbit.

However, space tourism will require tourism destination facilities in orbit. The existing destinations in orbit were designed for a few astronauts, and cost billions of dollars to construct and operate. Space tourism facilities will have to be much cheaper to construct and operate, and reducing costs to one-hundredth the level of existing destinations will be required in order to bring the cost of those space tourism destinations into line with the projected costs of the emerging reusable space passenger vehicles, which should be operational within a number of years. Such lower cost destinations will have to be austere facilities.

The first of such facilities in orbit will appeal mainly to the adventure traveler. The design of these facilities must address the full effect of microgravity on the human body, or risk Space Adaption Syndrome sickness for approximately half of the travelers. The space tourist industry must bridge the gap between the extremely expensive orbital research stations of today and future tourist comforts with destination facilities inexpensive enough to be privately funded under present financial constraints.

The first generations of destination facilities will likely be pre-assembled on the grounds, as construction in microgravity continues to evolve. Methods for construction of these first generation destination facilities as described below are with the frame of reference of conventional construction techniques. These techniques may or may not have to be optimized to accommodate the microgravity environment. A large continuous-walled structure such as that disclosed in U.S. Pat. No. 4,730,797 made from lightweight inflatable flexible walls may work someday in orbit, but the vacuum environment of space requires a rigid structure for safety, and strength, and to achieve the public acceptance required for development.

For example, studies have explored salvaging the external tank of the space shuttle in low Earth orbit for use in providing habitual structures in space. The existing external tank is now being replaced with a new lighter weight external tank performing the same function in the ascent, and which will also be salvageable using the same proposed salvage techniques.

The present invention relates to a torus design using the salvaged external tanks. The external tank derived torus design is cost effective, and provides a partial gravity space tourism facility in orbit requiring little new technology. Use of such a torus as a space tourism destination facility will require an economical form of public transportation to take tourists into orbit.

The external tank derived torus design of this invention may use the external tank or other orbital debris as described in U.S. Pat. No. 4,650,139, issued to the present inventor on Mar. 17, 1987, or U.S. Pat. No. 4,790,499, also issued to the present inventor on Dec. 13, 1988. In addition, the present invention may use the salvaged external tank of the space shuttle or other space hardware as described in U.S. Pat. No. 5,813,632, issued to the present inventor on Sep. 29, 1998, the entirety of which is hereby incorporated by reference.

SUMMARY OF THE INVENTION

Accordingly, besides the objects and advantages of cost effective facilities, additional objects and advantages of the invention include:

(a) to provide a method and design of modifying the external tank of the space shuttle, and other similar expendable hardware before launch and in orbit to permit reuse of the hardware for another, different purpose in space;

(b) to provide an assembly method and construction technique in orbit for the salvage and modification of the discarded hardware for reuse for a different purpose;

(c) to provide a first volume in orbit, which tests assembly methods, construction techniques, environmental control life support equipment, interior rigidized foam build out concepts, plant, animal closed life support balance, the integration of electrical, water, and other utilities, and a fatigue model for reliability monitoring as it becomes one of the pressurized volumes in the axis core for the first torus facility;

(d) to provide a segment torus ring made from individual pressurized modules connected together to provide the safety of segmented volumes, and the stability of an existing solid structure;

(e) to provide a rotating habitation environment capable of providing a centrifugal force to the objects in the volume of approximately 20% of the normal Earth gravity, and some relief from the inhibiting Space Adaptation Syndrome to its residents;

(f) to provide a curved connecting node to join straight line segments into a torus capable of rotation rates in the range of 2 revolutions per minute;

(g) to provide a pressurized volume in orbit capable of providing the oxygen, and other services similar to the 5,000 foot altitude internal pressure available in most commercial aircraft, provided by an advanced environmental control life support equipment, and required for housing 100 to 300 persons for short periods;

(h) to provide a theme destination resort interior environment with sufficient quality and logistics support for the start of tourist accommodations in orbit;

(i) to provide sufficient utilities including ventilation, water, sewer, electrical services, lights, artificial gravity, and other utilities for tourist operations;

(j) to provide specific food, recreational, and other facilities consistent with the reduced gravity, and tourist interior environment;

(k) to provide an increased payload volume, and weight requirements to effectively use the increased volume, and payload weight capability of an aft cargo pod under the external tank of the space shuttle;

(l) to provide an increased payload volume, and weight requirements to effectively use the increased volume of a forward cargo pod between the two tanks of the external tank of the space shuttle, and to use the increased payload volume capability of the liquid rocket boosters;

(m) to provide a basic building block of pressurized volume adapted from existing aerospace hardware salvaged in orbit; and (n) to provide a method and design capable of combining these basic building blocks into a torus capable of rotation in the microgravity conditions in low Earth orbit, and in deep space.

Further objects and advantages are to provide an easy to assemble, cost effective pressurized volume in orbit for a multitude of uses.

In accordance with the present invention an aerospace derelict in orbit can be salvaged and modified into a space facility providing an incremental habitation torus volume for use as a 200 person space hotel with 20% simulated gravity.

More specifically, the present invention provides a method of creating a volume having simulated gravity for use in space comprising salvaging launch hardware; creating a rigid structure from the salvaged launch hardware; and rotating the rigid structure, thereby providing centrifugal gravity in space.

In another aspect, the present invention provides an apparatus for use in space comprising a rigid structure including salvaged launch hardware, the salvaged launch hardware occupying most of the volume of the rigid structure, and wherein the salvaged launch hardware is connected to form a torus.

BRIEF DESCRIPTION OF ATTACHED DRAWINGS

The accompanying drawings, which are included to provide a further understanding of the invention and are incorporated in and constitute a part of this specification, illustrate an embodiment of the invention in which:

FIG. 1 is an exploded view of an external tank for the space shuttle, that is modified pre-launch in accordance with the present invention;

FIG. 2 is an end view of the external tank of FIG. 1;

FIG. 3A is a pressurized connection module in accordance with the present invention;

FIG. 3B is a second embodiment of a pressurized connection module;

FIG. 3C is a third embodiment of a pressurized connection module;

FIG. 3D is a fourth embodiment of a pressurized connection module;

FIG. 4A is an exploded view of a space shuttle and external tank including shuttle cargo bay transported cargo;

FIG. 4B is an exploded view of an external tank including aft and forward cargo bay transported cargo;

DETAILED DESCRIPTION PREFERRED EMBODIMENT

Figure 5:
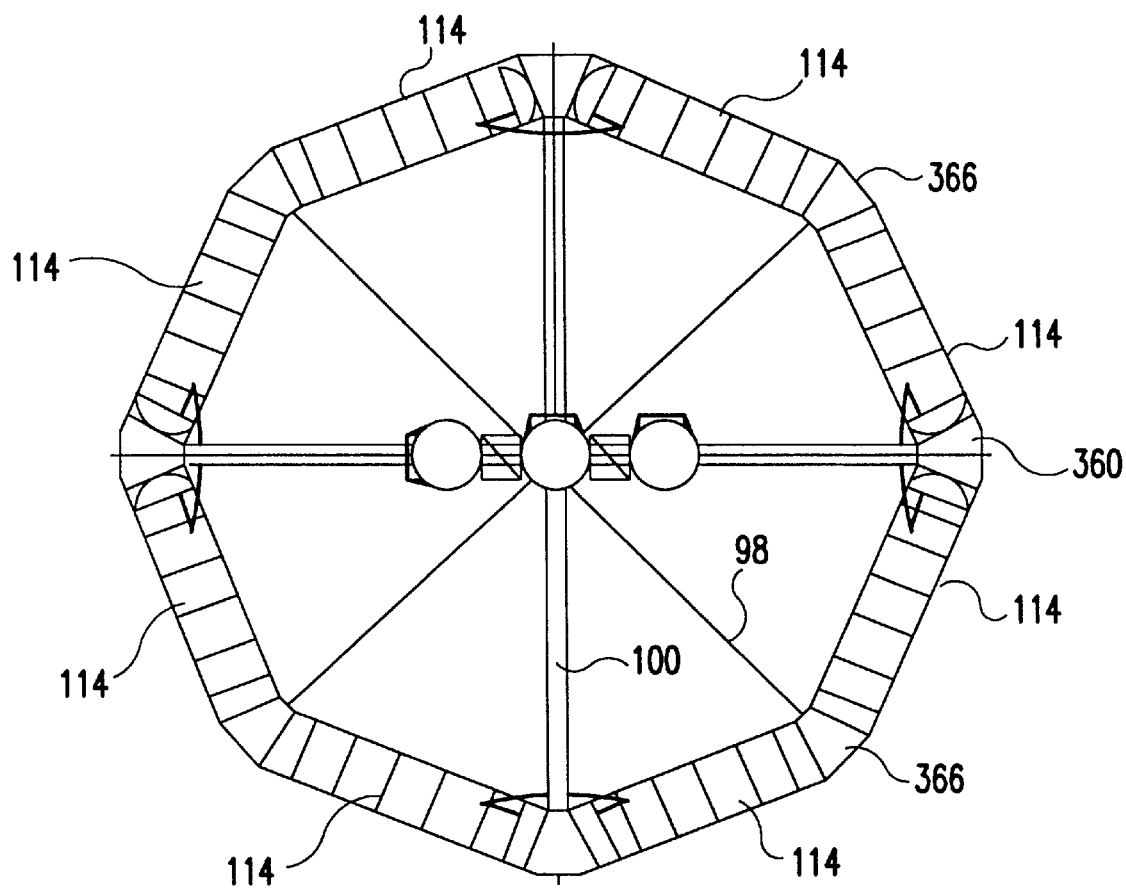
FIG. 5 is a top view of a torus assembled from straight line segments made from salvaged hydrogen tanks and connection modules in accordance with the present invention.

In the present invention, the inside of a derelict external tank or other derelict launch hardware is salvaged while in orbit to become the torus ring basic structural building block unit. These derelict external tanks are available for salvage because a new external tank is taken to 99% of full orbital velocity on each space shuttle mission and discarded after 8.6 minutes of use as a propellant container. Furthermore, expendable launch vehicles have hardware that performs the same general function as the space shuttle external tank, which hardware is also discarded as derelict. Therefore, the unmodified external tank of the space shuttle or other derelict launch hardware is then available for a number of second uses in orbit. One method for salvaging an unmodified external tank is disclosed in U.S. Pat. No. 5,813,632, issued to the present inventor on Sep. 29, 1998.

If modified, the external tank would be more valuable in orbit, because the modifications would expand the orbital reuse possibilities for the hardware. Such modifications can be grouped into pre-launch and post launch modifications.

FIG. 1 shows a preferred pre-launch modification to an external tank. The hydrogen tank 20 is a pressurized vessel of approximately 55,000 cubic feet, tested to over 40 psia, and used to transport cryogenic liquid hydrogen. The modification includes attachment of a welded ring 48 to the aft or forward ellipsoid dome cap 30. In orbit, the inner section of the dome cap which is within the welded ring 48 is removed, thereby providing an opening 48' of 10 feet or more to access the interior of the tank as shown in FIG. 2. The welded ring 48 also serves as a location for attaching and connecting other devices to the hydrogen tank 20 after the removal of the inner section of dome cap 30. In addition, an intertank connector 26 and an oxygen tank 68 are detached in orbit from hydrogen tank 20 at the bolted joint 22.

The modification also includes the attachment of a welded flange ring 28 to the exterior of the hydrogen tank 20 at the point where the dome cap 30 meets the straight-walled section of hydrogen tank 20, to permit bolted attachments during pre-launch and during orbit activities. A welded ring frame 40 of a first aft cargo pod 50 is then bolted or welded to the welded flange ring 28, and the first aft cargo pod 50 serves to support a second aft cargo pod 52.

The second aft cargo pod 52 serves to protect a payload (not shown) in the first aft cargo pod 50 from heat during launch. Therefore, the second aft cargo pod 52 is attached to the first aft cargo pod 50 only after the payload is secured in a stationary assembly (not shown) of the first aft cargo pod 50. The second aft cargo pad 52 is attached in such a manner that permits it to be disposed of upon the conclusion of its heating protection function.

A number of payloads can be transported into orbit in the 25 foot diameter by 20 foot long payload volume envelope in the first aft cargo pod 50 and second aft cargo pod 52, for example, the various connection modules as shown in FIGS. 3A–3D. For example, a large diameter pressurized connection module 36a shown in FIG. 3A is fabricated with human hatches 42 leading in at least four directions, which is used near the torus axis (see FIG. 7B). All of these modules are fabricated to bolt together via a standard connection ring 49, and to bolt to the welded ring 48 on dome cap 30. A second larger connection module 36b shown in FIG. 3B also has a set of human hatches 42 and connection rings 49, and is designed to rotate 180 degrees at rotation joints 38. Third and fourth connection modules 44a,b shown in FIGS. 3C and 3D are designed to be transported in the space shuttle payload bay, and have rotation rings 46 and human hatches 42.

The hydrogen tank 20 as shown in FIG. 1 has orbiter attachment hardware 32 including structural members, piping, electrical cable trays, and other items used for the ascent, which can be reused with some pre-work and modification in orbit. Assembly in orbit is aided by the existing bipod 24, and a temporary tether (not shown) attached thereto.

FIGS. 4A and 4B show a preferred embodiment of an external tank attached to a space shuffle for transportation into orbit and subsequent reuse. The external tank is equipped with hydrogen tank 20, oxygen tank 68, a forward cargo pod 54 located between intertank connector 26 and oxygen tank 68, and first and second aft cargo pods 50, 52. Preferably, the external tank is transported into orbit by the space shuttle orbiter 56 on a modified trajectory. During such a modified trajectory, the solid rocket boosters of the orbiter are discarded into the ocean for later reuse. The modified trajectory is a more direct trajectory to orbit partly because it eliminates, until orbit, the software sequence that performs the external tank jettison maneuver, and eliminates completely some propellant use and operations associated with the external tank jettison.

The external tank remains attached to the space shuttle orbiter 56, and is disassembled for reuse in orbit, using salvage techniques as disclosed in U.S. Pat. No. 5,813,632. Once disassembled, the hydrogen tank 20 is converted for reuse by inserting materials such as inflatable interior units 60 (transported into orbit in the forward cargo pod 54), inflatable interior units 62 (transported into orbit in the first aft cargo pod 50), and inflatable interior units 64 (transported in the shuttle cargo bay). The inflatable units 60, 62 and 64, and rigid frame interior utility units 66 (also shuttle cargo bay transported) are inserted through the 10 foot diameter opening 48' created in the dome cap 30 by removing the section of the dome cap inside the welded ring 48 on either end of the hydrogen tank 20 as shown in FIG. 2. A connection module 36a (FIG. 3A) may also be transported into orbit in the first aft cargo pod 50 and attached to the welded ring 48 in orbit, or may be attached to the welded ring 48 prior to launch. The disassembled and converted hydrogen tank 20 remains in orbit for reuse, while the space shuttle orbiter 56 is returned to the surface. A subsystem payload package (not shown) provides power, communications and other services for conversion, as disclosed in U.S. Pat. No. 5,813,632.

FIG. 5 is a top view of a 150-person habitat single torus ring assembled from a plurality of converted hydrogen tanks held together with cable bracing 98, and long connector passengerways 100 to join the torus ring with a core axis comprised of a converted hydrogen tank. Additional converted hydrogen tanks form straight line segments 114, joined together at each end by connection modules 36a,b and 44a,b or a combination thereof.

Figure 6:
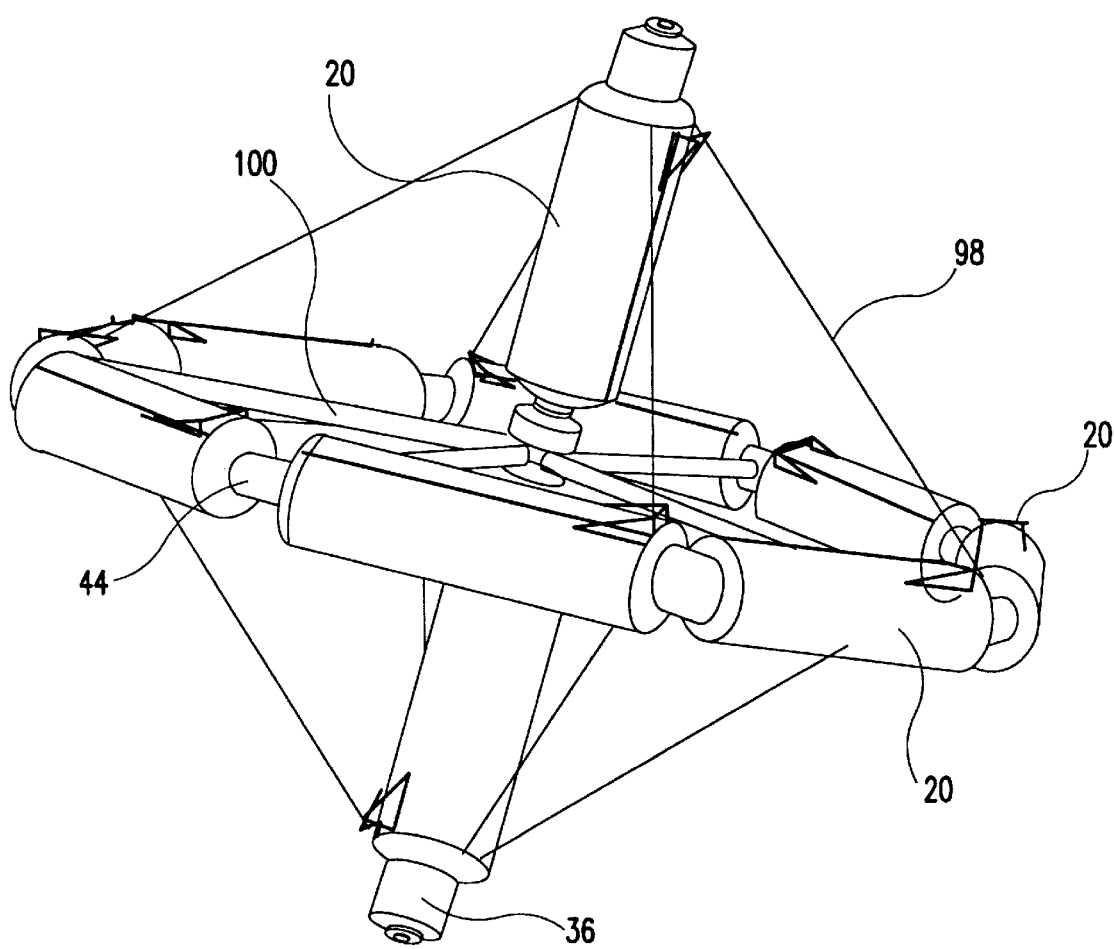
FIG. 6 is a perspective view of the torus of FIG. 5.

FIG. 6 is an perspective view of a second embodiment of a torus ring connected by connection modules 44 to form a 300 foot diameter torus capable of rotating 2 revolutions per minute to provide 20 to 23% of normal Earth gravity to inhabitants inside the rotating torus.

The torus is set in motion by a set of small attitude control propulsion systems spaced 180 degrees apart from each other on the torus outer surface. Some natural rotation is expected in orbit along with a gravity gradient stability with the long axis pointing toward the center of the earth. The attitude control propulsion system is also capable of correcting the slight tendency of the torus to wobble, until counter-rotating torus units are able to work together. Rotation rates from about 1 rpm to about 3 rpm are within the structural capability of the torus and the human body's ability to adapt to the environment without some discomfort. At rotation rates much above 3 rpm, people would begin to notice a Coriolis effect and experience some discomfort. Also, the greater the rotation rate the greater the load on the torus, which would require an undesirable increase in the structural strength and weight of the torus.

The torus is connected to the core axis made up of hydrogen tanks 20 and a connection module 44 by the connector passengerway units 100, which act as spokes of a wheel, and are large enough to allow human transport to and from the torus on vertical belt movers (not shown). The entire unit is stabilized by cable bracing 98.

Figure 7A:
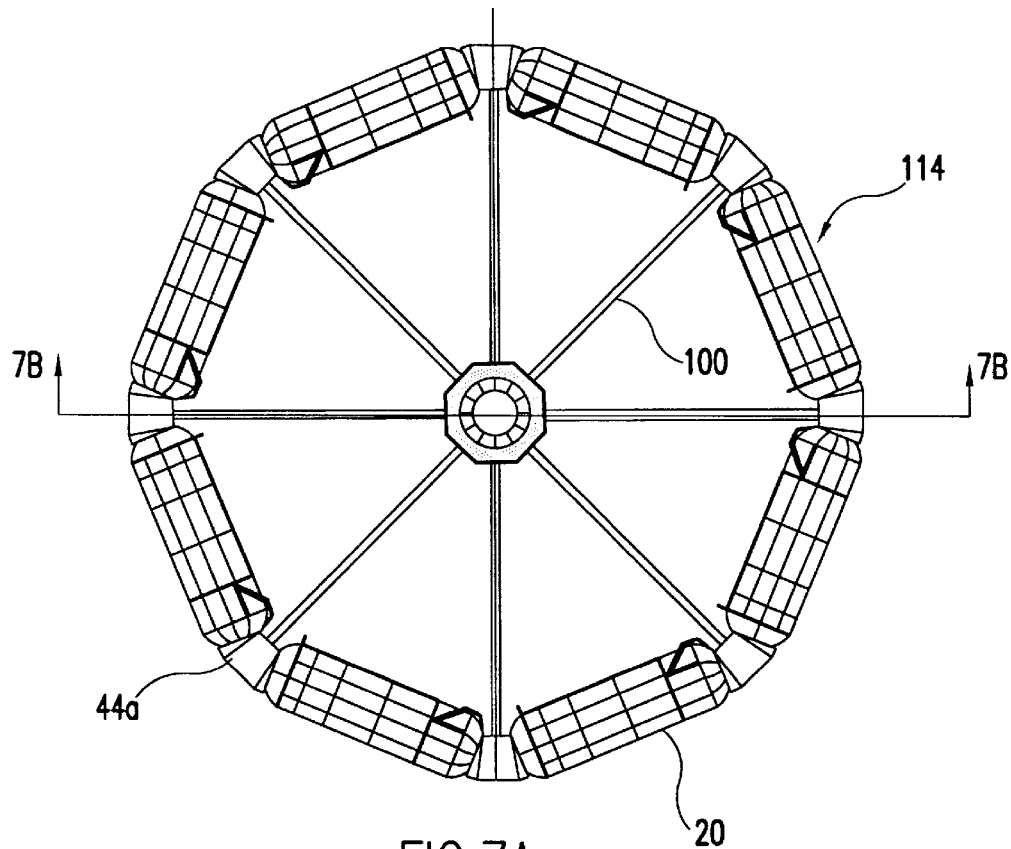
FIG. 7A is a top view of another embodiment of a torus facility.
Figure 7B:
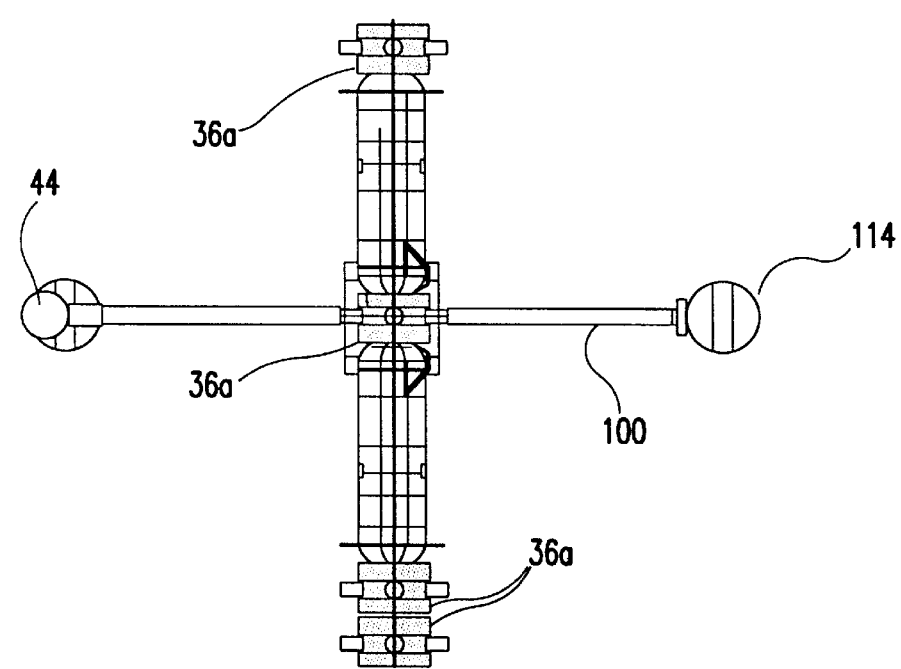
FIG. 7B is a cross-sectional view taken along the lines 7B—7B in FIG. 7A.

FIG. 7A shows a top view of a third embodiment of a torus assembled from hydrogen tanks 20. A similar torus could be derived from other derelict launch debris. The hydrogen tanks 20 are converted and connected together in an eight ring torus made up from straight line segments 114 approximately 100 feet long. The straight line segments 114 are connected with connection modules 44a to form an approximately 300 foot diameter torus ring with approximately one half a million cubic feet inside, and capable of rotation at 2 rpm for a centrifugal force created artificial gravity. Critical connecting locations use large connection module 36a to perform a de-spin function to permit the transfer of passengers, a transition to the torus at the center of the torus, and other functions. Connector passengerways 100 connect the microgravity core to the simulated gravity (approximately 20% of normal Earth gravity) created in the torus as it rotates. Eight connector passengerways 100 connect the structural ring of eight straight line segments 114 into a useful partial gravity environment for tourists. FIG. 7B is a cross-sectional view along the line 7B—7B in FIG. 7A.

Figure 8A:
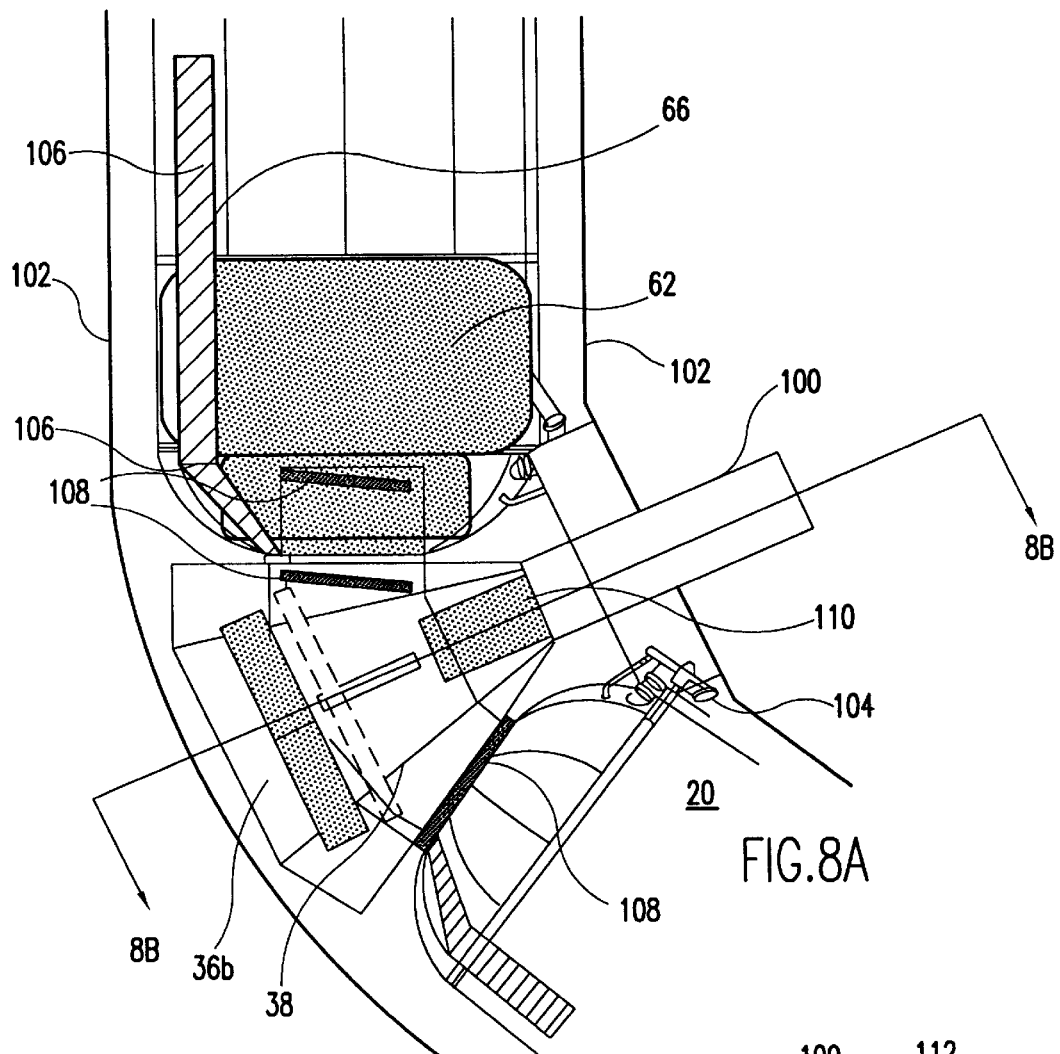
FIG. 8A is a top view of the connecting node for joining basic building block modules.
Figure 8B:
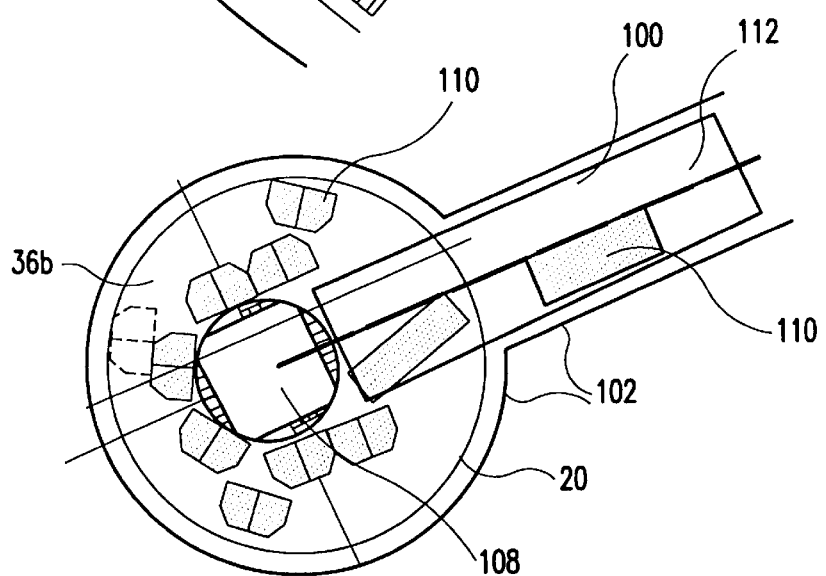
FIG. 8B is a cross-sectional view taken along the lines 8B—8B in FIG. 8A.

FIG. 8A shows an embodiment of the connection between a pair of adjacent hydrogen tanks 20 connected by a connection module 36b. FIG. 8B is a cross-sectional view along the line 8B—8B in FIG. 8A. This embodiment includes maintenance and repair capabilities provided by permitting removal and replacement of an environmental control life support unit 110 through the shuttle transportation system to the point of use and back again to Earth for upgrade and maintenance. The environmental control life support unit 110 is sized to fit through the connector passengerway 100 with a rotating conveyor belt 112, and capable of removal from the location in the large connection module 36b with the rotation joint 38 to a repair and refurbishment site on the surface of the Earth.

This transportation route is important, because it will be used to transport all food, minimal luggage, other repair parts and almost everything not a liquid or gas. This transportation route must work without gravity or with some gravity at one end, and at every gravity level in between in order to be effective in the assembly phase in orbit. It must also work effectively with the emerging reusable space transportation vehicles.

The route starts at environmental control life support locations grouped around safety hatch-human passageway 108 in the large connection module 36b. The large connection module 36b is designed to rotate, and provide sufficient volume to allow the removal of the environmental control life support units 110, transport through the connector passengerway 100, transfer to the core through the large connection module 36b in the torus center, and transport to Earth via a space transportation vehicle.

The transport through the connector passengerway 100 is accomplished with a rotating conveyor belt 112 designed with platforms spaced adequately to transport humans, environmental control life support units 110, and any other bulk cargo requirements. The connector passengerway 100 will provide a gradual transition from zero gravity at the center to the simulated gravity available in the torus structural ring of tanks.

This transportation route works for small items, but does not work in the assembly stage when larger inflatable items are used during conversion of the hydrogen tank 20. The conversion of the interior of the hydrogen tank 20 requires inflatable interior units 60 (transported compressed in the forward cargo pod 54), inflatable interior units 62 (transported in the aft cargo pod 50) and inflatable interior units 64 and frame interior utility units 66 (both transported in the shuttle cargo bay), which are inserted before rotation of the large connection module 36b or before access is no longer available through the other end of the hydrogen tank 20. The inflatable interior units 64 are inserted into the interior of the hydrogen tank 20 partly assembled, utility connections are made, and the interior units 64 are inflated to full volume. This interior assembly can be performed in microgravity, with a pressure from full vacuum to pressurized volume.

The inflatable interior units use existing and developing technology to expand and rigidize the segments of interior components. These inflatable components use layers of rigid structural foam between layers of textured cloth, plastic, and other materials interwoven with lighting, plumbing, and other materials required to accommodate human habitation. As shown in FIGS. 8A and 8B, the utility units 66 are mated using utility line connections 106, and some existing external tank utility lines 104 are reused.

A foam stabilized external fabric sleeve and debris barrier 102 is pulled over the torus exterior, and then rigidized using structural foam to provide a barrier around the torus and to break up high speed particles and other items capable of puncturing the pressure boundary. Some high speed particles will be too large to be broken up by the debris barrier 102, and will puncture the pressure boundary. When this happens, a self sealing two component series of layers of liquid between plastic layers will mix inside the pressure boundary to provide a secondary sealing foam capable of sealing large holes in a temporary manner until adequate repair can be accomplished. A series of safety hatches in the human passageways 108 close when pressure is decreased or other danger is perceived.

Figure 9A:
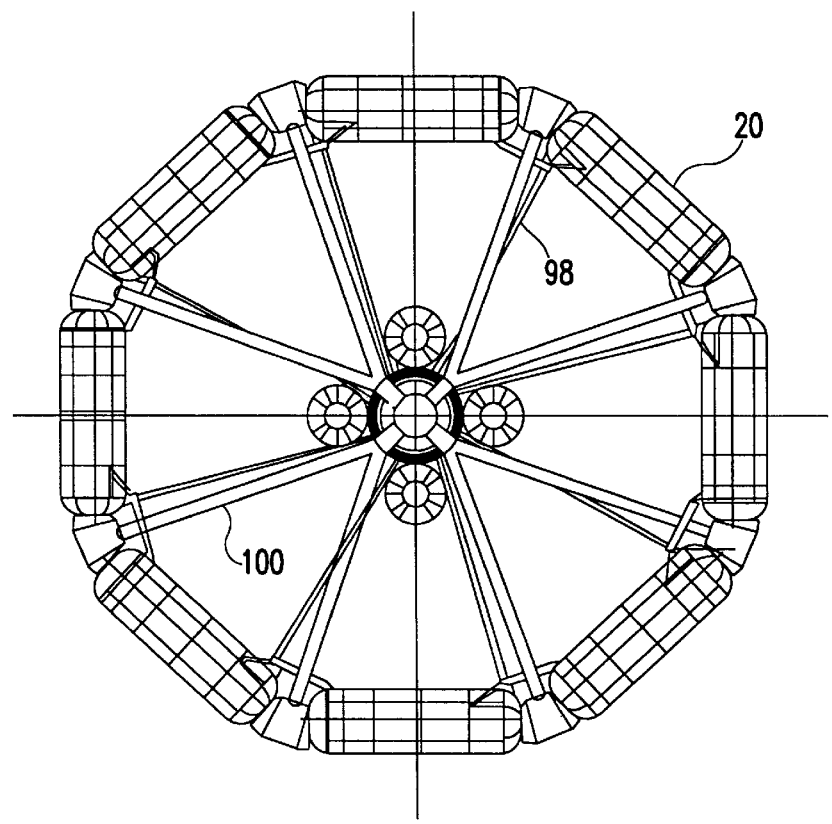
FIG. 9A is a top view of another embodiment of a torus facility.
Figure 9B:
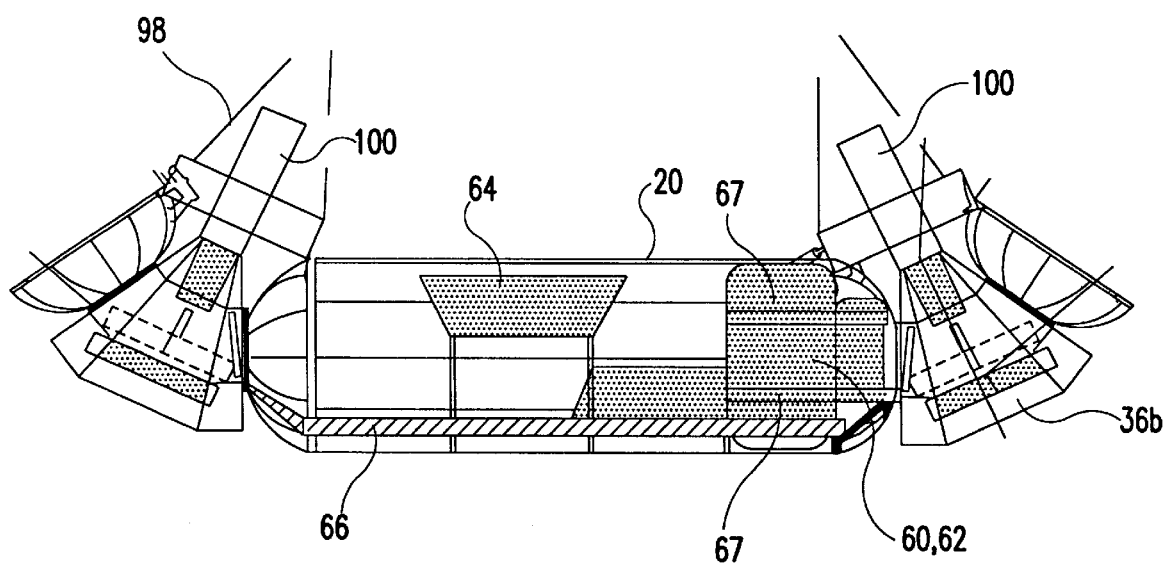
FIG. 9B is a top view of the interior of one segment of the torus facility of FIG. 9A.

FIGS. 9A and 9B depict another embodiment of the human habitation volumes created in the interior of hydrogen tanks 20. The inflatable interior units 60, 62, 64 and interior utility units 66 are integrated into living and working volumes inside the salvaged hydrogen tank 20 or other derelict launch debris. The interior walls and floors 67 are constructed using layers of plastic and foam with embedded electrical, plumbing and other utilities. The connector passengerway 100 connects with the large connection module 36b and also uses cable bracing 98.

Figure 10A:
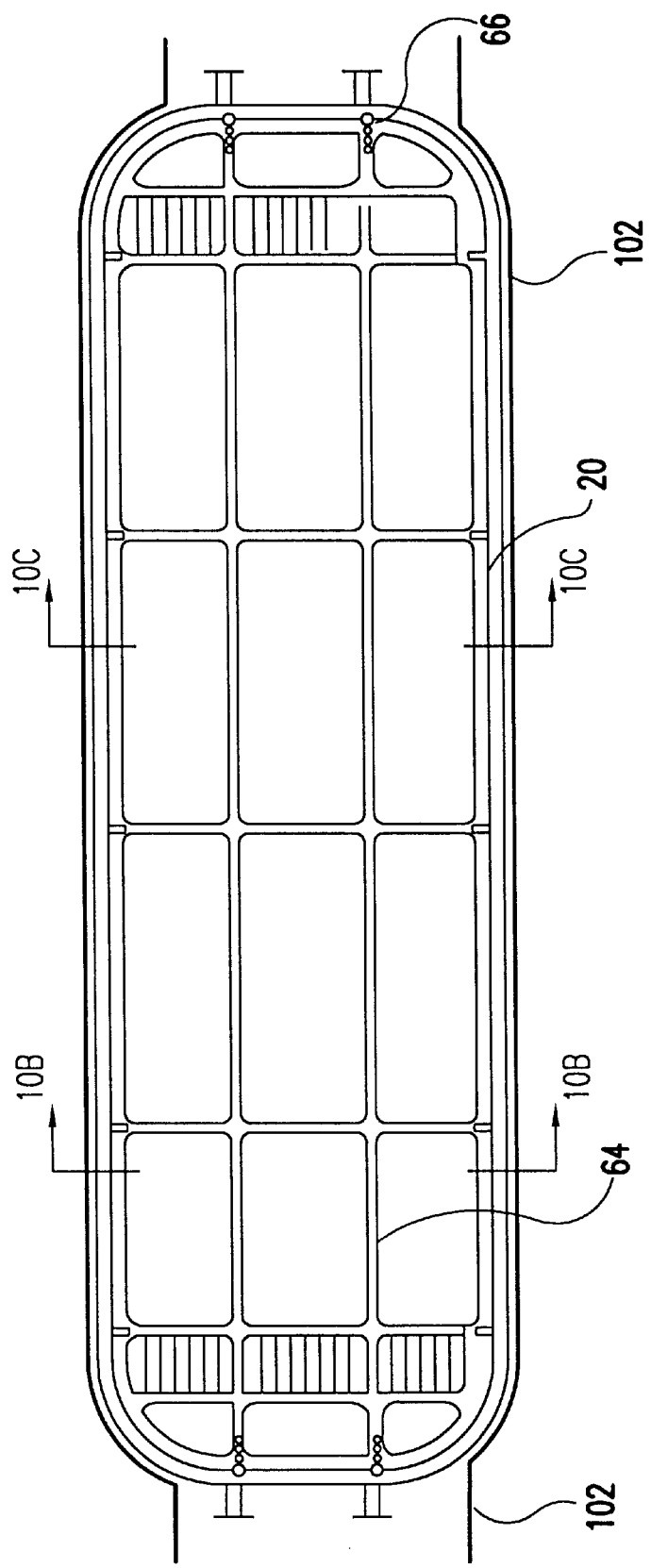
FIG. 10A is a top view of one embodiment of habitation volumes with full utilities and human living environment within one segment of a torus facility.
Figure 10C:
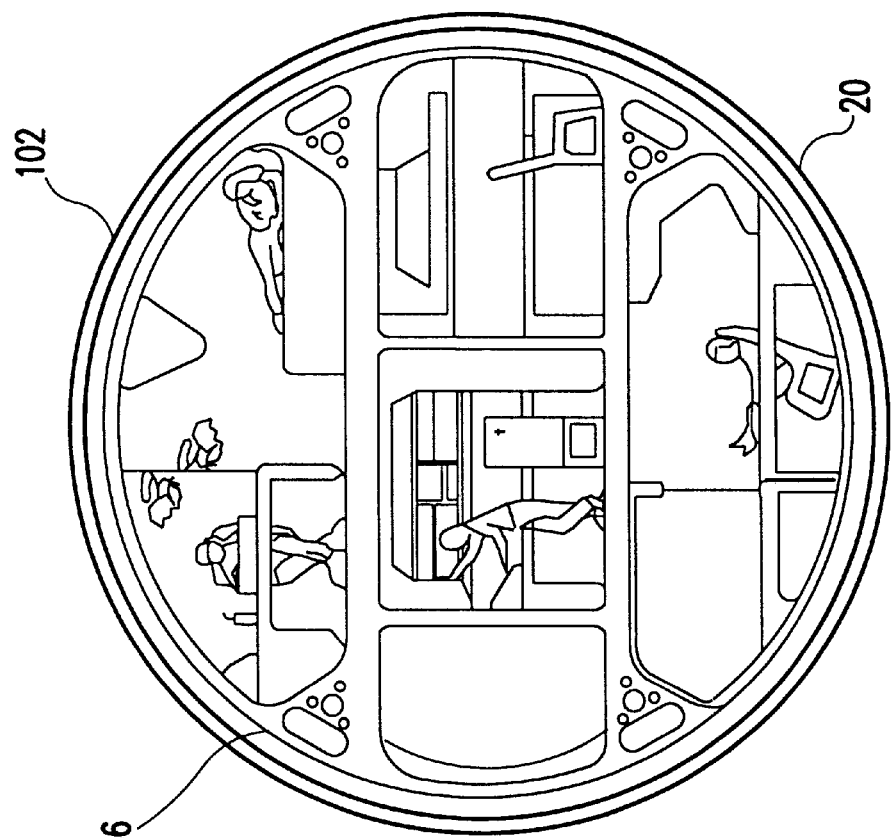
FIG. 10C is a cross-sectional view taken along the lines 10C–10C in FIG. 10A.
Figure 10B:
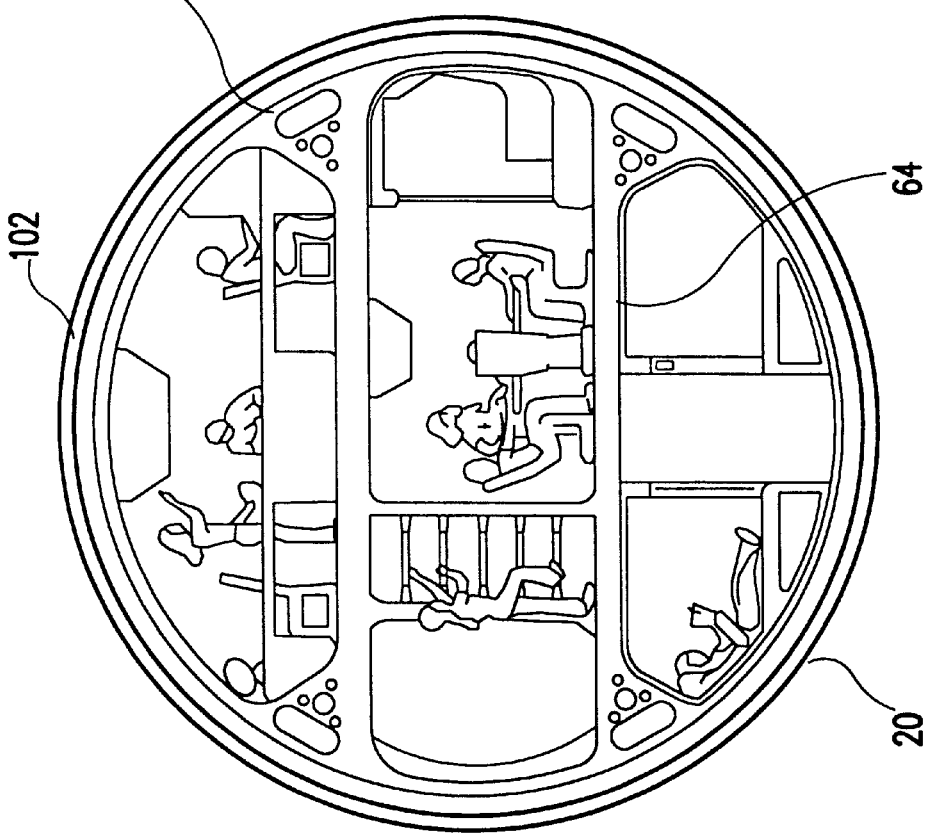
FIG. 10B is a cross-sectional view taken along the lines 10B—10B in FIG. 10A.

FIGS. 10A, 10B and 10C depict another embodiment of business and habitation volumes with inflatable units 64 providing support for interior utility units 66 inside the pressure hull of the salvaged hydrogen tank 20 or other derelict launch debris. The problem of exterior puncture is solved with the foam stabilized external fabric sleeve debris barrier 102.

The human body starts to adjust to the microgravity of orbit almost immediately, and bone mass decreases at a rate of approximately 5% per month. The introduction of simulated gravity reduces this health effect, and provides an environment that is reasonably pleasant enough to draw adventure-type tourists for the trip to the facility in orbit on the emerging reusable space transportation vehicles.

The operation of the torus as a hotel includes tourist passenger travel from the surface to a de-spun large connection module 36b for unloading, and microgravity hand over hand passage through the 100 foot long hydrogen tank 20 core axis tank to the large connection module 36b in the center of the torus. The passenger boards the rotating flexible conveyor belt 112 (FIG. 8B) with small human platforms attached. The passenger floats to the belt 112, and grabs a handrail, and hooks his feet into foot restraints on the small platform. The passenger is positioned with his head toward the center of the torus, and rides down the belt 112 toward the outer ring as the gravity gradually changes from zero to twenty percent of normal Earth gravity. The passenger reaches the outer ring, and the platform rotates away in the large connection module 36b as the passenger retains a hold on the handrail and is lowered to the floor. The tourist is directed to a small hotel room consistent with the 20% gravity and the adventure atmosphere created.

Thus, the torus of the invention provides a cost effective, realistic first gravity facility in orbit that can be used by persons of most ages able to launch into orbit in a vehicle exerting 3 g's on the space tourists. The invention is a balance between cost effectiveness, and adventure tourism in an orbital environment where government programs once built state of the art space stations but can no longer sustain the high budgets of the past. Tourism is the largest industry on the planet, and space tourism is a commercial industry that can drive the economics of the space frontier.

Figure 11B:
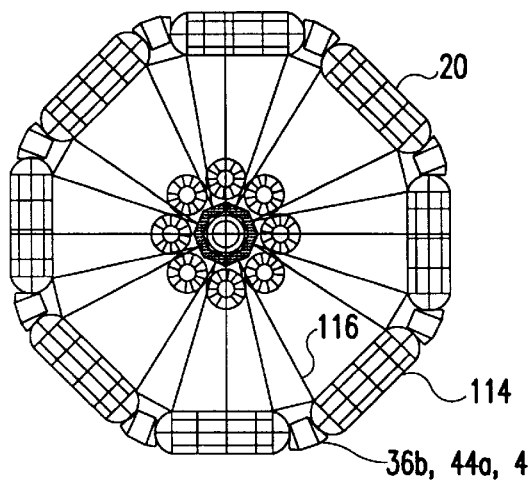
FIG. 11B is a cross-sectional view taken along the lines 11B—11B in FIG. 11A.
Figure 11C:
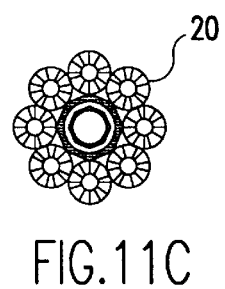
FIG. 11C is a cross-sectional view taken along the lines 11C—11C in FIG. 11A.
Figure 11D:
FIG. 11D is a cross-sectional view taken along the lines 11D—11D in FIG. 11A.
Figure 11E:
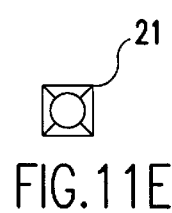
FIG. 11E is a cross-sectional view taken along the lines 11E—11E in FIG. 11A.
Figure 11A:
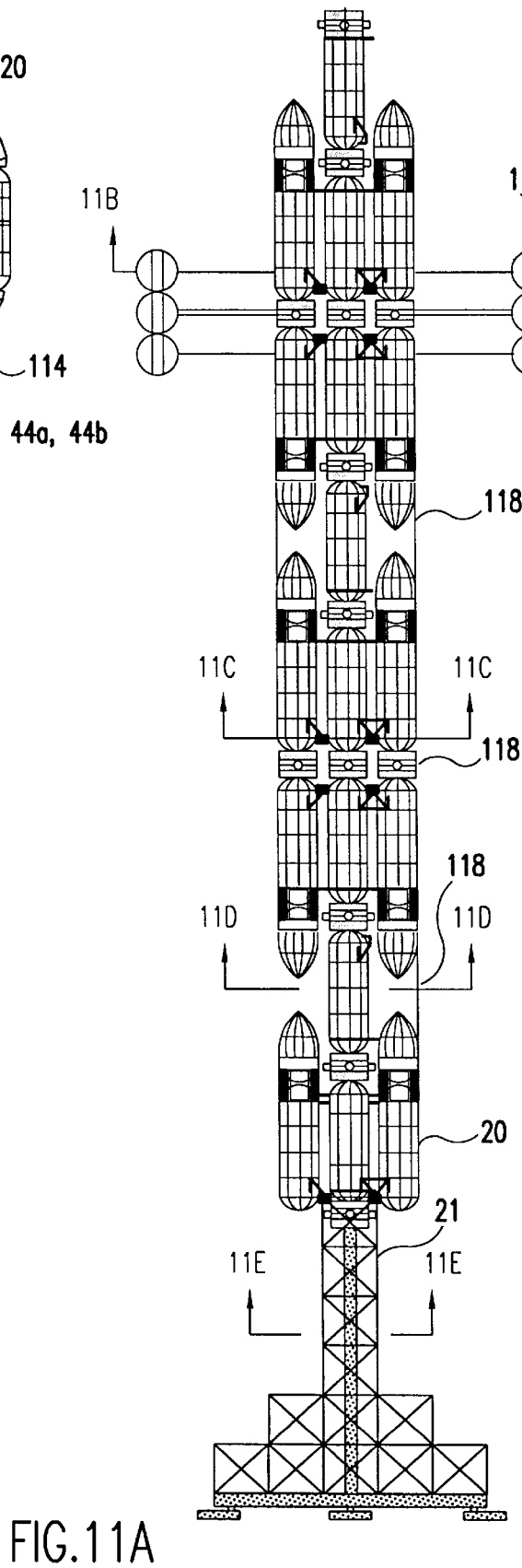
FIG. 11A is a side view of a multiple torus facility embodiment in accordance with the present invention.

FIG. 11A, and the various cross sections shown in FIGS. 11B–11E, depict an embodiment of the invention for use in the development of water-based near-Earth asteroids. The hydrogen tank 20 is used as a basic building block along with other salvaged and transported items to produce torus structural rings of eight straight line segments 114 and additional structural cables 116 to accommodate the load of 20 to 30 external tanks filled with water. An upper portion of the vehicle remains at the asteroids being developed for housing the crew, and extracting the water resource. The lower half support structure 21 is used as a platform that is capable of transporting 20 external tank loads of water to Earth orbit where it is marketed as water, propellants, and used for other purposes. The extra mass requires additional connecting cables 118.

As before, the hydrogen tank 20 of the space shuttle 56 is modified before and after being launched into orbit, and in orbit a plurality of hydrogen tanks 20 are connected together in an eight ring torus made up from straight line segments 114 approximately 100 feet long. The straight line segments 114 can be connected with a large connection module 36b or with a small connection module 44a,b to form an approximately 300 foot diameter torus ring with an interior volume of approximately one half a million cubic feet, and capable of rotation at 2 rpm for a centrifugal force created artificial gravity. Critical connecting locations use the large connection module 36b to perform de-spin function to permit the transfer of passengers, a transition to the torus from the center of the torus, and other functions.

While preferred embodiments of the present invention have been described, it will be understood by those skilled in the art that various changes and modifications may be made, and equivalents may be substituted for elements thereof without departing from the true scope of the present invention. For example, the actual design will incorporate maintenance of the environmental control life support units 110 through the shuttle transportation system, and the damping of rotational forces with a counter rotating duplicate torus. The figures depict a simple version of the torus derived from one type of derelict, and the torus can be derived from many different derelict materials. Therefore, it is intended that the present invention not be limited to the particular embodiment disclosed, but that the present invention include all embodiments falling within the scope of the appended claims.

What is claimed is:

1. A method of creating a volume having simulated gravity for use in space comprising:
   salvaging launch hardware;
   creating a rigid structure from salvaged launch hardware, the salvaged launch hardware occupying most of the volume of the rigid structure; and
   rotating the rigid structure, thereby providing centrifugal gravity in space, wherein the creating of the rigid structure includes positioning two or more pressurized volumes parallel to a long axis of the rigid structure and at different distances from a rotation point of the rigid structure, such that gravity levels within the pressurized volumes differ from one another.

2. The method as in claim 1, further comprising treating an interior of at least part of the rigid structure to accommodate biological habitation.

3. The method as in claim 1, wherein the creating of a rigid structure includes connecting a pressurized volume perpendicular to a long axis of the rigid shape in a torus shape with various gravity levels parallel to the torus axis.

4. The method as in claim 1, wherein the creating of a rigid structure includes connecting a series of rotating pressurized volumes in a torus shape.

5. An apparatus for use in space comprising a rigid structure including salvaged launch hardware, the salvaged launch hardware occupying most of the volume of the rigid structure, wherein the rigid structure includes two or more pressurized volumes positioned parallel to a long axis of the rigid structure and at different distances from a rotation point of the rigid structure, such that gravity levels within the pressurized volumes differ from one another.

6. The apparatus of claim 5, wherein the rigid structure includes at least two objects of salvaged launch hardware and the rigid structure further comprises a connection module connecting the objects.

7. The apparatus of claim 6, wherein each object has a welded ring on at least one end thereof and the connection module includes a connection ring for connecting the connection module to each of the welded rings.

8. The apparatus of claim 7, wherein the connection module includes a hatch at any end adjacent to an object.

9. The apparatus of claim 8, wherein the hatch is large enough to accommodate a human passing therethrough.

10. The apparatus of claim 9, wherein the connection module is rotatable.

11. The apparatus of claim 5, wherein the rigid structure includes a plurality of objects of salvaged launch hardware connected to form a torus.

12. The apparatus of claim 11, further comprising a core structure through a center axis of the torus.

13. The apparatus of claim 12, further comprising connector spokes connecting the core structure to the objects forming the torus.

14. The apparatus of claim 13, wherein the connector spokes are large enough to accommodate a human passing therethrough.

15. The apparatus of claim 13, further comprising cable bracing between the core structure and the objects.

16. The apparatus of claim 15, further comprising connector modules connecting the objects to one another.

17. The apparatus of claim 16, wherein each connector spoke is joined to a respective connector module.

18. The apparatus as in claim 5, wherein at least one interior segmenting wall is disposed in the salvage launch hardware, whereby the salvage launch hardware is divided into more than one interior volume capable of providing safety in the event of puncture in the salvage launch hardware.

19. The apparatus as in claim 18, further comprising a structural foaming barrier surrounding an exterior surface of each of the salvage launch hardware, the structural foaming barrier being activated by a change in vacuum condition.

* * * * *